No. 858,017. PATENTED JUNE 25, 1907.
G. M. PENCE.
MACHINE FOR MIXING CONCRETE.
APPLICATION FILED JAN. 18, 1907.
2 SHEETS—SHEET 1.

WITNESSES:
E. J. Stewart
Hubert D. Lawson

George M. Pence,
INVENTOR

By C. A. Snow & Co.
ATTORNEYS

No. 858,017. PATENTED JUNE 25, 1907.
G. M. PENCE.
MACHINE FOR MIXING CONCRETE.
APPLICATION FILED JAN. 18, 1907.

2 SHEETS—SHEET 2.

WITNESSES:

George M. Pence,
INVENTOR

ATTORNEYS

UNITED STATES PATENT OFFICE.

GEORGE M. PENCE, OF TOPEKA, INDIANA.

MACHINE FOR MIXING CONCRETE.

No. 858,017.                Specification of Letters Patent.             Patented June 25, 1907.

Application filed January 18, 1907. Serial No. 352,994.

*To all whom it may concern:*

Be it known that I, GEORGE M. PENCE, a citizen of the United States, residing at Topeka, in the county of Lagrange and State of Indiana, have invented a new and useful Machine for Mixing Concrete, of which the following is a specification.

This invention relates to machines for mixing concrete and its object is to provide a machine of this character which is of comparatively simple construction and which will combine cement and sand in proper proportions and thoroughly mix them, subsequently moistening said mixture.

With these and other objects in view the invention consists of certain novel features of construction and combinations of parts which will be hereinafter more fully described and pointed out in the claims.

In the accompanying drawings is shown the preferred form of the invention.

Figure 1:
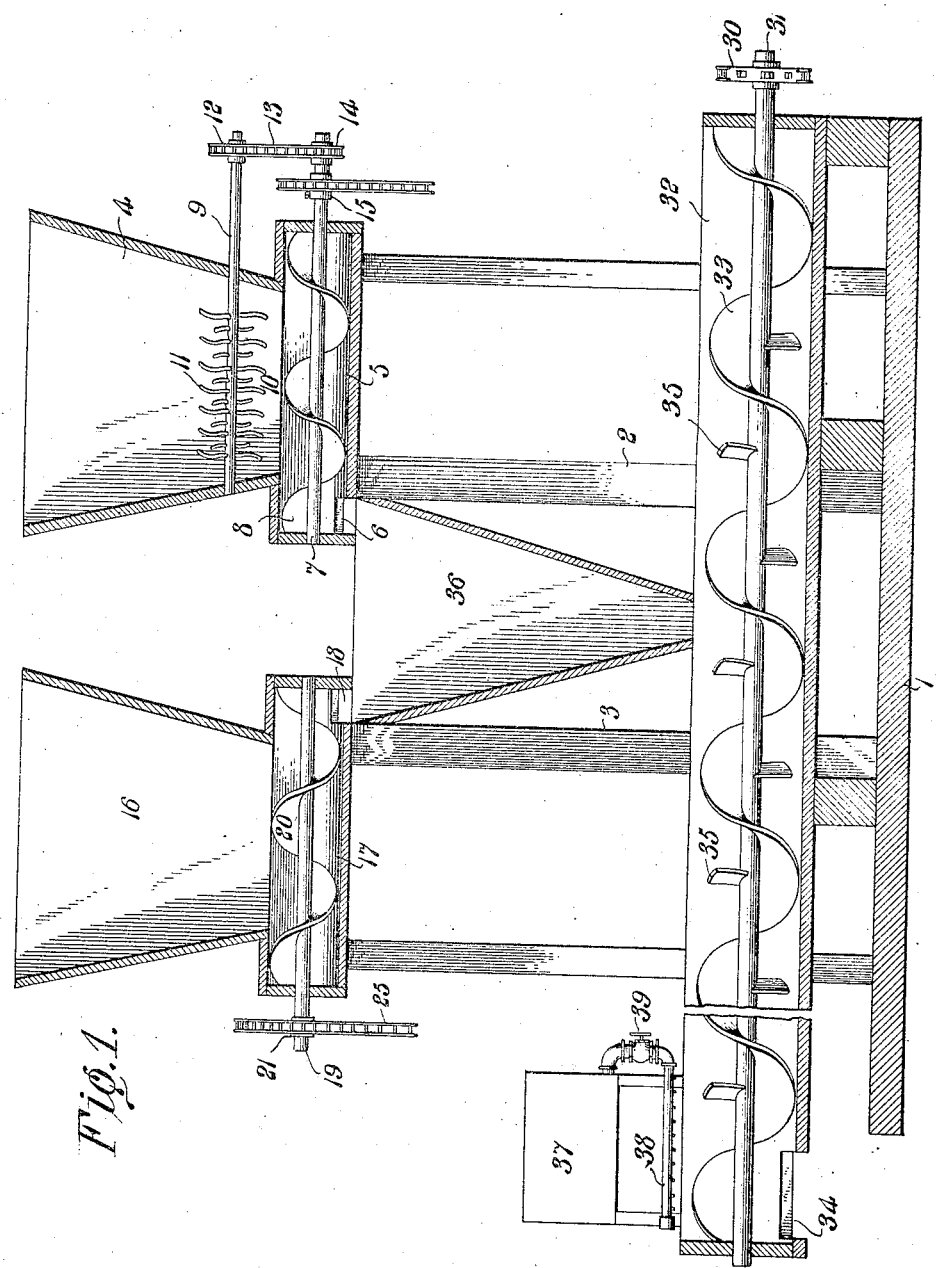
Figure 3:
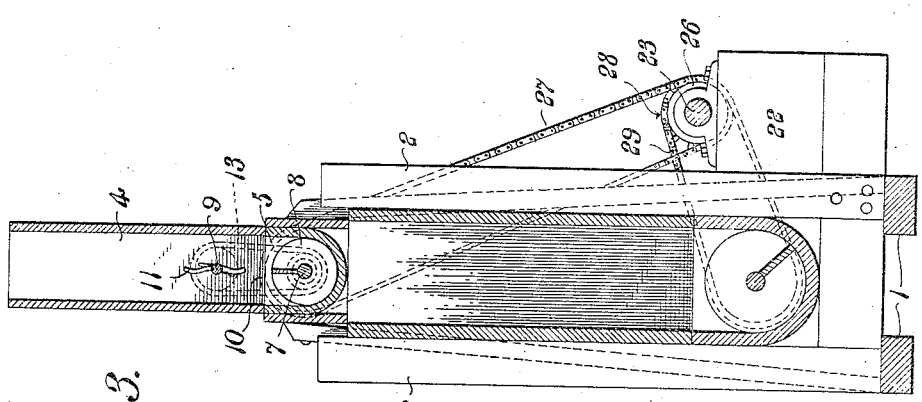
Figure 2:
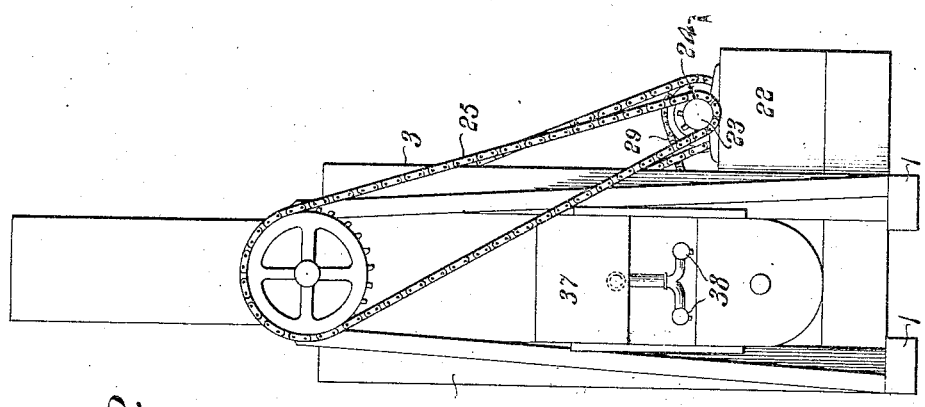

In said drawings: Figure 1 is a vertical longitudinal section through the machine; Fig. 2 is an end elevation thereof; and Fig. 3 is a vertical transverse section.

Referring to the figures by character of reference, 1, 1 are base sills on which are supported uprights 2 and 3. Arranged on the uprights 2 is a hopper 4 opening into a trough 5 provided with an outlet 6 at one end. A shaft 7 extends longitudinally through this trough and has a worm 8 thereon adapted, when the shaft is rotated in one direction, to feed material within the trough toward the outlet 6. Another shaft 9 extends through the hopper 4 near its outlet 10 and arranged on this shaft and within the hopper are series of agitating arms 11 preferably curved from end to end and of different lengths. A sprocket 12 is secured on the shaft 11 and receives motion through a chain 13 from a sprocket 14 on shaft 7. Another sprocket 15 is secured to shaft 11.

Arranged upon the uprights 3 is a hopper 16 the bottom of which opens into a trough 17 having an outlet 18 at one end. A shaft 19 extends longitudinally within the trough and carries a worm 20 which is adapted, when the shaft 19 is rotated in one direction, to feed material within the trough toward the outlet 18. A sprocket 21 is secured on the shaft 19.

Mounted on suitable supports 22 is a drive shaft 23 having a sprocket 24 adapted to transmit motion through a chain 25 to the sprocket 21. Another sprocket 26 is secured to said shaft and comprises a chain 27 which extends over the sprocket 15. A third sprocket 28 is secured to shaft 23 and drives a chain 29 which engages a sprocket 30 on a shaft 31 extending through a mixing trough 32. This trough extends below the troughs 5 and 17 and the shaft 31 carries a worm 33 adapted when rotated to feed the material within the trough toward an outlet 34 a one end of the trough. Arranged along the shaft 31 are paddles 35 disposed reversely to the worm so that when the worm is rotated these paddles will result in the thorough mixing of the material within the trough before it is discharged by the worm through the outlet. A main hopper 36 is disposed above the trough 32 and the outlets 6 and 18 of the upper troughs open into it. A tank 37 is supported above the trough 32 near its outlet and has one or more outlet pipes 38 connected thereto and adapted to spray water upon the mixture as it passes thereunder.

When shaft 23 is rotated all of the other shafts of the apparatus will at the same time be rotated in the same direction thereby causing all of the worms to feed material in the paths thereof toward the outlets and their respective troughs. A supply of sand is placed within the hopper 4 and cement within the hopper 16, and the worms 8 and 20 are so proportioned both as to their pitch and speed of rotation that the proper proportion of sand and cement will be constantly discharged through the outlets 6 and 18 and into hopper 36. From this hopper the material is discharged into trough 32 where it is fed to the discharge 34 by worm 33. Paddles 35 thoroughly mix the material and just prior to the discharge of the material from trough 32 the water from pipes 38 is sprayed upon the mixture. The amount of water supplied to the mixture can be readily controlled by a valve 39. It is to be understood that the arms 11 serve to keep the sand constantly agitated and prevent the outlet of hopper 4 from clogging. Moreover these arms insure a continuous feed of the sand to the trough 5.

It will be seen that this machine is very simple and compact in construction and constitutes an efficient means for thoroughly mixing cement.

What is claimed is:

The combination with a mixing trough having an outlet, spraying means supported above the outlet, and a worm revoluble in the trough, said worm having reversely disposed paddles; of a main hopper opening into the trough, supply hoppers supported above and at opposite sides of the main hopper, a trough below and disposed to receive material from each supply hopper, each of said troughs extending over and opening into the main hopper, a worm revoluble in each of said troughs, agitating means in one of said hoppers, and driving mechanism for the worms.

In testimony that I claim the foregoing as my own, I have hereto affixed my signature in the presence of two witnesses.

GEORGE M. PENCE.

Witnesses:
A. L. GERBER,
ELVA PARKS.